United States Patent [19]
Mills

[11] Patent Number: 5,964,677
[45] Date of Patent: Oct. 12, 1999

[54] SHIFT MECHANISMS, LOCK ASSEMBLIES AND METHODS OF ADJUSTING A GEAR RATIO OF A TRANSMISSION

[75] Inventor: Ned Mills, West Richland, Wash.

[73] Assignee: Speed Control, Inc., Kennewick, WA

[21] Appl. No.: 09/109,562

[22] Filed: Jul. 2, 1998

[51] Int. Cl.[6] ..................................................... F16H 3/70
[52] U.S. Cl. .............................. 475/170; 475/169; 74/117
[58] Field of Search .................................... 475/170, 162, 475/169; 74/117, 473.24, 483 R; 280/260

[56] References Cited

U.S. PATENT DOCUMENTS

| | | |
|---|---|---|
| 363,629 | 5/1887 | Grant . |
| 1,832,384 | 11/1931 | Hall et al. . |
| 1,872,636 | 8/1932 | Greening et al. . |
| 2,209,417 | 7/1940 | Obermoser . |
| 3,848,474 | 11/1974 | Epstein ................................... 74/117 X |
| 4,164,153 | 8/1979 | Moritsch et al. . |
| 4,299,581 | 11/1981 | Korosue . |
| 4,352,297 | 10/1982 | Nardi . |
| 4,660,427 | 4/1987 | Fenton . |
| 4,697,469 | 10/1987 | Takamiya et al. . |
| 4,983,151 | 1/1991 | Pires ........................................ 475/170 |
| 5,081,877 | 1/1992 | Mercat . |
| 5,108,352 | 4/1992 | Pires ........................................ 475/170 |
| 5,454,766 | 10/1995 | Mills . |
| 5,516,132 | 5/1996 | Simpkins . |
| 5,632,702 | 5/1997 | Mills . |
| 5,685,794 | 11/1997 | Willmot ................................. 475/170 |

FOREIGN PATENT DOCUMENTS

| | | |
|---|---|---|
| 0 208 473 | 1/1987 | European Pat. Off. . |
| 393180 | 4/1924 | Germany . |
| 332825 | 12/1935 | Italy . |
| 34-1722 | 3/1959 | Japan . |
| 63-145851 | 6/1988 | Japan . |
| 63-285358 | 11/1988 | Japan . |
| WO 95/06829 | 3/1995 | WIPO . |

*Primary Examiner*—Dirk Wright
*Assistant Examiner*—Peter T. Kwon
*Attorney, Agent, or Firm*—Wells, St. John, Roberts, Gregory & Matkin P.S.

[57] ABSTRACT

The present invention includes shift mechanisms, lock assemblies and methods of adjusting a gear ratio of a transmission. According to one aspect of the invention, a shift mechanism configured to adjust a transmission includes a central axle defining a central axis; a drive member configured to rotate about the central axle responsive to an application of a driving force to the drive member; and a mount assembly comprising a mount support and an eccentric mount, the mount support being provided about the central axle and the eccentric mount defining an eccentric axis, the eccentric mount being movably coupled with the mount support to provide radial adjustment of the eccentric axis relative to the central axis and wherein resultant forces are generated responsive to the eccentric axis being spaced from the central axis, and the mount assembly being configured to utilize at least one resultant force to assist with movement of the eccentric mount with respect to the mount support.

39 Claims, 10 Drawing Sheets

SHIFT MECHANISMS, LOCK ASSEMBLIES AND METHODS OF ADJUSTING A GEAR RATIO OF A TRANSMISSION

TECHNICAL FIELD

The present invention relates to shift mechanisms, lock assemblies and methods of adjusting a gear ratio of a transmission.

BACKGROUND OF THE INVENTION

Changeable speed transmissions for bicycles have been proposed and used for many years. These have included various rear wheel hub transmissions, which typically achieved two or three specified speed reductions, as well as derailleur systems, which use a driving chain as a force transmitting element between selectable rear and/or front sprockets.

An improved transmission is described in U.S. Pat. No. 5,632,702 to Mills (the '702 patent), assigned to the assignee of the present invention and incorporated herein by reference. This patent discloses a continuously variable transmission. This patent further teaches the use of a sprocket which serves as an adjusting mechanism operably connected to an inner eccentric element and outer eccentric element. Adjusting the position of the inner eccentric element and the outer eccentric element adjusts the gearing of the transmission.

The '702 patent teaches the use of a worm gear to provide increased torque to the extension shaft of the disclosed adjustment mechanism. Such a configuration eases the adjustment and selection of the desired gear ratio provided by the transmission. This is favorable to reduce the impact of working forces exerted on the internal components of the transmission during operation.

U.S. patent application Ser. No. 08/991,815, now allowed, entitled Shift Mechanisms and Methods of Controlling a Transmission, filed Dec. 16, 1997, naming Ned Mills and Benjamin K. Jones as inventors, assigned to the assignee hereof, and incorporated herein by reference, discloses the use of a hydraulic shift mechanism for adjusting the gear ratio of a continuously variable transmission. Such utilizes a master cylinder and slave cylinder configuration to provide shifting of the transmission.

The present invention discloses apparatuses and methods of providing operator control of the gearing of a transmission.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect of the invention, a shift mechanism configured to adjust a transmission includes a central axle defining a central axis; a drive member configured to rotate about the central axle responsive to an application of a driving force to the drive member; and a mount assembly comprising a mount support and an eccentric mount, the mount support being provided about the central axle and the eccentric mount defining an eccentric axis, the eccentric mount being movably coupled with the mount support to provide radial adjustment of the eccentric axis relative to the central axis and wherein resultant forces are generated responsive to the eccentric axis being spaced from the central axis, and the mount assembly being configured to utilize at least one resultant force to assist with movement of the eccentric mount with respect to the mount support.

A second aspect of the present invention provides a shift mechanism configured to adjust a transmission, the shift mechanism comprising: a central axle defining a central axis; a drive member configured to rotate about the central axle; a driven member configured to rotate about the central axle; a mount assembly comprising a mount support and an eccentric mount, the mount support being provided about the central axle and the eccentric mount defining an eccentric axis, the eccentric mount being configured to move with respect to the mount support and provide radial adjustment of the eccentric axis relative to the central axis and change the gear ratio of the transmission; and a lock assembly coupled with the mount assembly and configured to lock the position of the eccentric mount relative to the mount support.

Another aspect of the present invention includes a lock assembly of a continuously variable transmission which includes an eccentric mount assembly configured to change the gear ratio of the transmission, the lock assembly comprising: an upshift member configured to rotate about a central axle of the transmission and implement an upshift gearing operation of the transmission; a downshift member configured to rotate about the central axle of the transmission and implement a downshift gearing operation of the transmission; and a retaining assembly comprising a retaining member and a retaining disk provided about the central axle, the retaining member being coupled with the upshift member and the downshift member and configured to rotate about the retaining disk responsive to rotation of one of the upshift member and the downshift member, the retaining member being further configured to lock the position of the upshift member relative to the retaining disk.

According to another aspect, the invention provides a transmission comprising: a central axle defining a central axis; a drive member configured to rotate about the central axle responsive to an application of a driving force to the drive member; a driven member configured to rotate about the central axle; an orbiter configured to couple the drive member and the driven member; a mount assembly comprising a mount support and an eccentric mount, the mount support being provided about the central axle, and the orbiter being configured to rotate about the eccentric mount and the orbiter and the eccentric mount define an eccentric axis, the eccentric mount and the orbiter being configured to move with respect to the mount support and provide radial adjustment of the eccentric axis relative to the central axis, and wherein resultant forces are generated responsive to the eccentric axis being spaced from the central axis, and the mount assembly being configured to utilize at least one resultant force to assist with movement of the eccentric mount with respect to the mount support; and a lock assembly coupled with the mount assembly and configured to lock the position of the eccentric mount relative to the mount support.

A method of adjusting a gear ratio of a transmission according to one aspect of the present invention comprises: providing a plurality of rotatable members configured to rotate about a central axle which defines a central axis, the rotatable members being configured to rotate responsive to an application of a driving force; providing a shift mechanism about the central axle and including an eccentric mount configured to define an eccentric axis; adjusting the position of the eccentric mount relative to the central axle to adjust the gear ratio of the transmission, the adjusting creating resultant forces; and utilizing at least some of the resultant forces to assist with the adjusting.

According to yet another aspect of the invention, a method of providing a desired gear ratio of a continuously variable transmission comprising: providing a central axle; providing a mount assembly including a mount support and an eccentric mount; adjusting a position of the eccentric mount relative to the mount support to adjust the gear ratio of the continuously variable transmission; and locking the position of the eccentric mount relative to the mount support.

Figure 1:
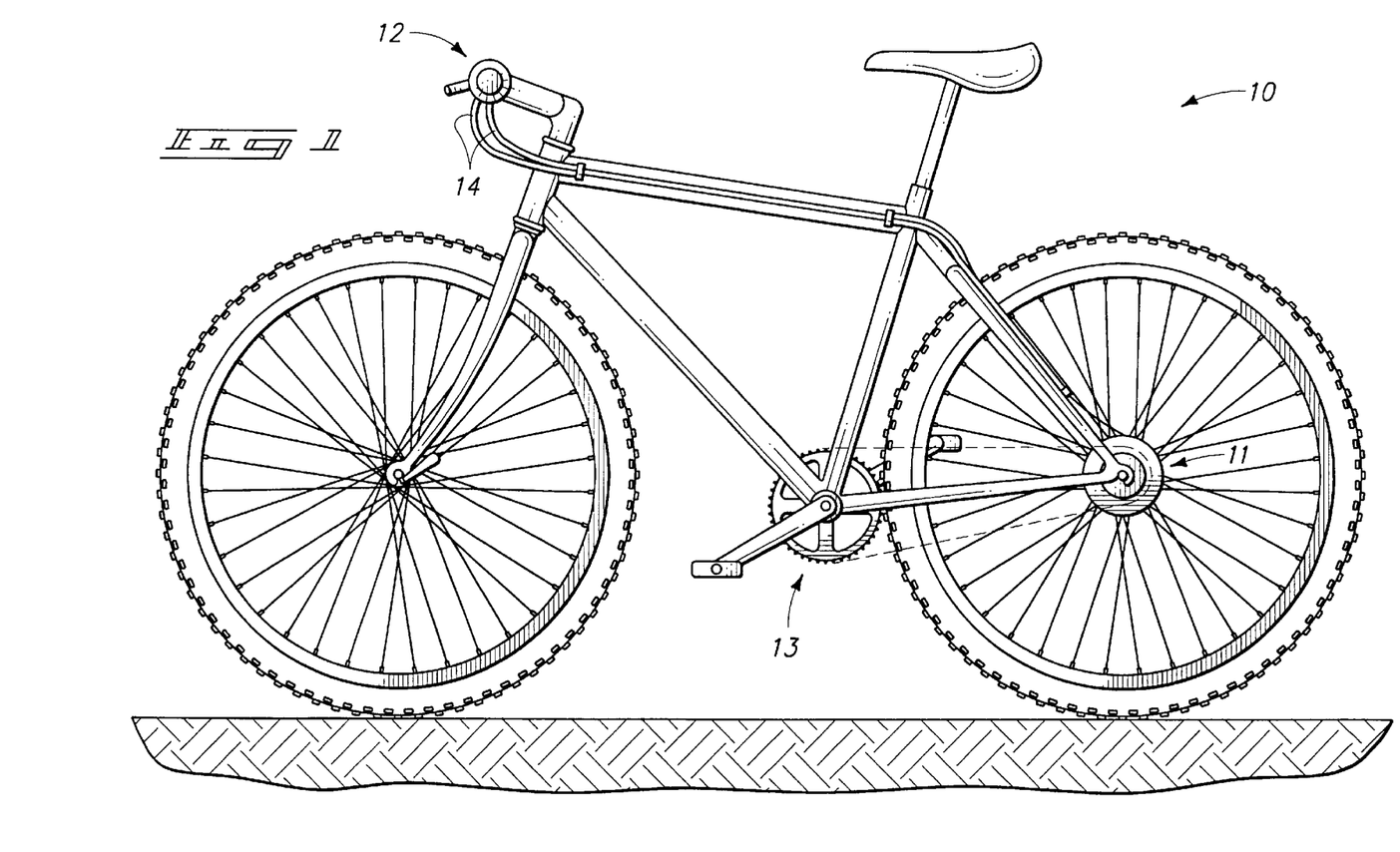
FIG. 1 is an elevated side view of a bicycle embodying the present invention.

Referring to FIG. 1, a bicycle 10 embodying the present invention is illustrated. More specifically, bicycle 10 comprises a continuously variable transmission 11 and a shift mechanism therefor. The disclosed shift mechanism is described herein with reference to a continuously variable transmission, such as the transmission disclosed in the '702 patent. The described bicycle transmission is exemplary. It is to be understood that shift mechanisms in accordance with the present invention may be utilized in other bicycle applications or with other transmissions. In addition, shift mechanisms of the present invention can be used or modified for use in vehicles other than bicycles.

Transmission 11 is located within the rear hub of bicycle 10 in the depicted embodiment. Transmission 11 is configured to receive a driving force from a crank arrangement 13 of bicycle 10. A conventional chain can be utilized to translate forces input via crank 13 to transmission 11.

Bicycle 10 includes a control assembly 12 operable to permit a user to selectively control the shift mechanism and the gearing ratio of transmission 11. As described in detail below, plural cables 14 couple control assembly 12 with transmission 11. Responsive to operator control utilizing assembly 12, the gear ratio of transmission 11 can be adjusted dependent upon the desired speed. More specifically, control assembly 12 is operable to control the position of an eccentric mount relative to a mount support as described below.

Figure 2:
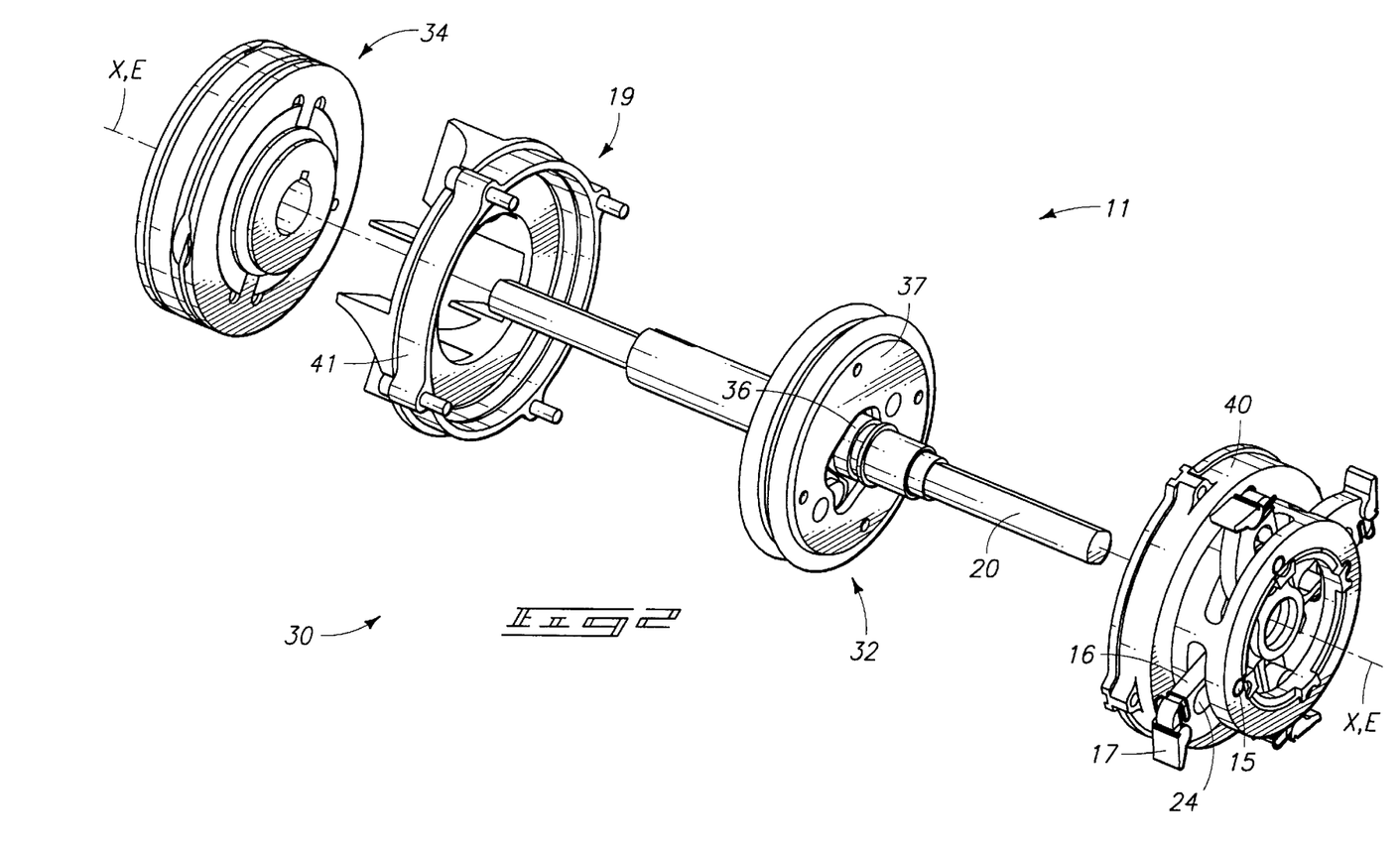
FIG. 2 is an exploded view of a shift mechanism and continuously variable transmission components of the bicycle.

Referring to FIG. 2, one embodiment of continuously variable transmission 11 is illustrated in detail. The illustrated continuously variable transmission 11 includes an orbiter 19 configured for rotation about a central axle 20. The rear wheel of bicycle 10 is configured to rotate about axle 20. Axle 20 defines a central axis X—X.

Figure 3:
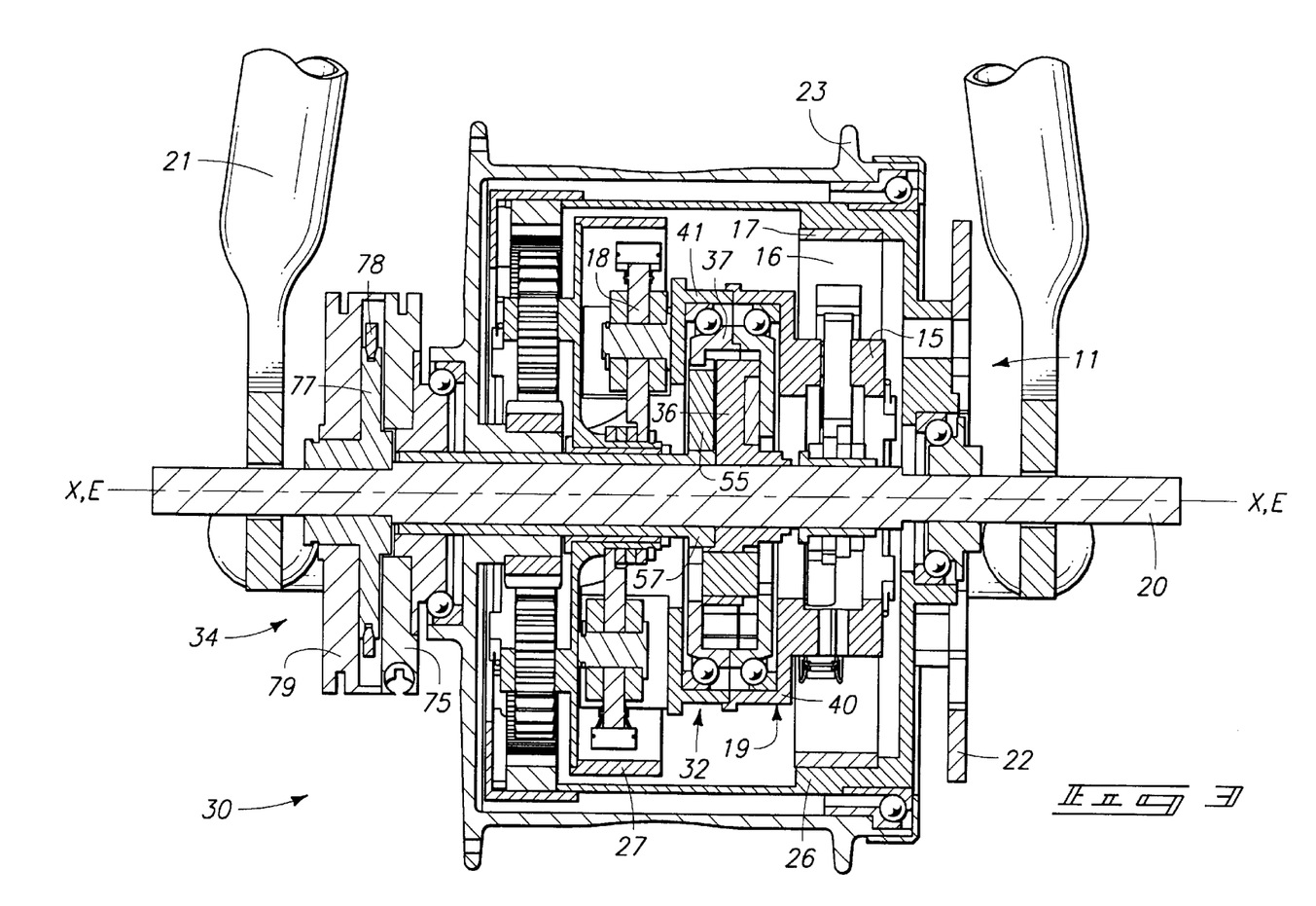
FIG. 3 is a cross-sectional view of the transmission of FIG. 2 mounted upon a frame of a bicycle.

Orbiter 19 comprises a right housing 40 and a left housing 41. Right housing 40 of orbiter 19 includes a plurality of input vanes 16. Left housing 41 includes a plurality of slots configured to couple with plural output vanes (output vanes 18 of transmission 11 are shown in FIG. 3). Input vanes 16 and output vanes 18 are configured for rotation about central axle 20 of bicycle 10. Orbiter 19 is provided to operably couple a drive member 22 and a driven member 23 using input vanes 16 with output vanes 18. Input vanes 16 individually include a tooth 17 configured to engage an input drive member such as an input ratchet, or other drive member, as described below. Further, input vanes 16 are configured to couple with orbiter 19. More specifically, orbiter 19 includes plural pins 15 and input vanes 16 individually include a corresponding slot 24. Slots 24 are configured to receive pins 15 in the described embodiment.

Orbiter 19 is configured for rotational movement about a variable eccentric axis E—E of an eccentric mount described below. The eccentric axis E—E is coaxial and parallel with central axis X—X in FIG. 2. The axis of rotation of orbiter 19 is radially adjustable with respect to central axis X—X. Adjustment of the axis of rotation of as orbiter 19 adjusts the gear ratio of transmission 11 as described in detail in the '702 patent.

A shift mechanism 30 is also illustrated in FIG. 2. The depicted shift mechanism 30 comprises a mount assembly 32 and a lock assembly 34. Mount assembly 32 comprises a mount support 36 and an eccentric mount 37. Mount support 36 is provided about central axis 20. Eccentric mount 37 defines the eccentric axis E—E. Orbiter 19 is configured to rotate about eccentric axis E—E and eccentric mount 37 of mount assembly 32.

Eccentric mount 37 is movably coupled with mount support 36 to provide radial adjustment of the eccentric axis E—E relative to central axis X—X. Radial adjustment of the position of the eccentric mount 37 (and eccentric axis E—E) with respect to mount support 36 and the central axis X—X adjusts the gear ratio of transmission 11.

As described in detail below, eccentric mount 37 slides between predefined first and second extreme positions during adjustment of the gearing ratio of the associated transmission 11 (the first and second extreme positions of eccentric mount 37 with respect to mount support 36 are illustrated below in FIG. 5 and FIG. 6, respectively). In addition, eccentric mount can be maintained or locked at any location in between the extreme first and second positions to provide the desired gearing ratio. As illustrated, eccentric axis E—E is coaxial with central axis X—X when eccentric mount 37 is provided in the first position. Referring to FIG. 3, transmission 11 is depicted mounted within a rear hub of bicycle 10. In particular, transmission 11 is mounted upon central axle 20 which comprises the rear axle of bicycle 10 in the depicted embodiment. Central axle 20 is received within frame 21 of bicycle 10. In the preferred embodiment, central axle 20 is keyed for receipt within frame 21 of bicycle 10. Preferably, central axle 20 is locked to frame 21 and fixed thereto.

Transmission 11 is coupled with drive member 22 and driven member 23. Members 22, 23 comprise individual rotatable members. Drive member 22 and driven member 23 are configured to rotate about central axle 20 responsive to an application of a driving force (e.g., an external peddling force input via crank 13) to drive member 22.

In the depicted arrangement, drive member 22 comprises a drive sprocket. Drive member 22 operates as an input drive element which is chain driven from crank 13. Drive member 22 is operably coupled with an input ratchet 26 to impart driving force to ratchet 26. Driving engagement is provided between a drive ring of input ratchet 26 and teeth 17 of input vanes 16.

One embodiment of driven wheel hub 23 comprises a bicycle wheel hub. Driven member or hub 23 is operably coupled to an output ratchet 27. Driven member 23 and output ratchet 27 are configured to rotate about central axis X—X in response to sequential driving engagement between the outer ends of a plurality of output vanes 18 and a driven ring of output ratchet 27. Operation of exemplary transmission 11 is described in further detail in the '702 patent.

Shift mechanism 30 is operable to adjust transmission 11 responsive to operator input via control assembly 12. In particular, shift mechanism 30 is configured to adjust the gear ratio of transmission 11 intermediate drive member 22 and driven member 23. In one embodiment, transmission 11 provides an adjustable gear ratio within a range of 1 to 1 and 3.5 to 1.

Orbiter 19 is operable to rotate about eccentric mount 37. Plural bearing races are provided intermediate orbiter 19 and eccentric mount 37. The operator of bicycle 10 can control the gearing ratio of transmission 10 by adjustment of the position of eccentric mount 37 (and eccentric axis E—E defined thereby) relative to central axle 20 and central axis X—X.

Lock assembly 34 is mounted about central axle 20 and outside of driven member 23 in the depicted embodiment. Lock assembly 34 is coupled with mount assembly 32 in the described embodiment via a shift tube 57. Lock assembly 34 is provided in the preferred embodiment to lock the position of the eccentric mount 37 relative to mount support 36 and central axle 20. In addition, lock assembly 34 is operable to control the movement of eccentric mount 37 with respect to mount support 36 and reduce feedback forces applied to control assembly 12. Such feedback forces can comprise resultant forces described below.

Figure 4:
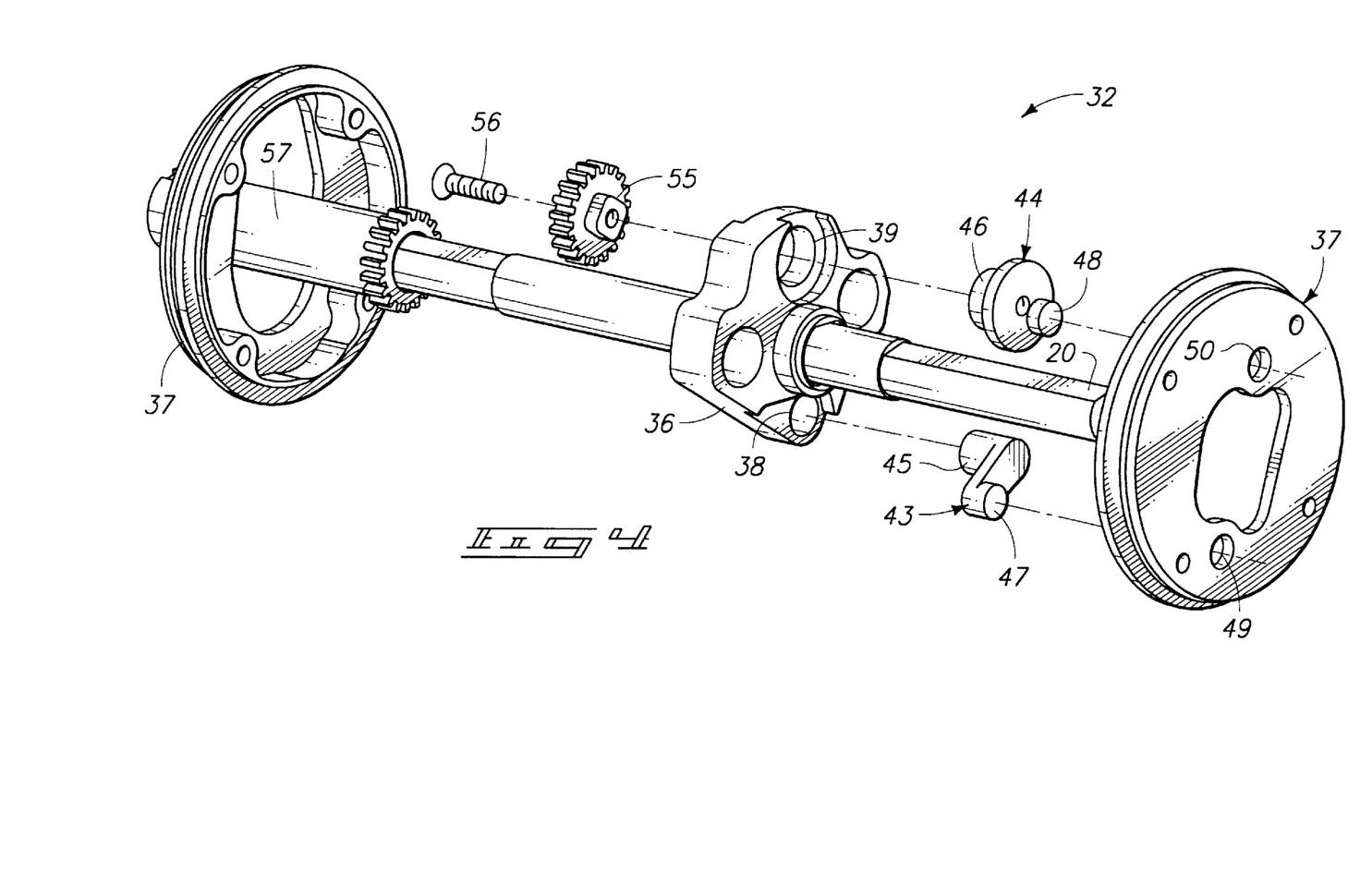
FIG. 4 is an exploded view of a mount assembly of the shift mechanism.

Referring to FIG. 4, internal components of mount assembly 32 are illustrated. Mount support 36 is shown provided upon central axle 20. In the depicted arrangement, mount support 36 is affixed to central axle 20 in a predefined orientation. In particular, mount support 36 does not move with respect to central axle 20.

Mount support 36 forms a boss in the described embodiment. Mount support 36 also includes plural bores (only two bores 38, 39 are labelled as such in FIG. 4). Given the fixed relationship of mount support 36 with respect to central axle 20 and frame 21, displacements of eccentric mount 37 occur along a predefined path intermediate the first and second extreme positions responsive to input from control assembly 12.

Plural links including an idle link 43 and a shift link 44 are configured for engagement with mount support 36 and eccentric mount 37. Idle link 43 and shift link 44 operate to define a linkage having plural bars to couple mount support 36 and eccentric mount 37.

Links 43, 44 are individually configured to rotate with respect to pivots 45, 46 which are received within respective bores 38, 39 of mount support 36.

Eccentric mount 37 is shown disassembled into right and left housing portions in FIG. 4. The right housing of eccentric mount 37 includes plural apertures 49, 50. Links 43, 44 include respective pivots 47, 48 which are configured for reception within corresponding apertures 49, 50 of right housing of eccentric mount 37.

Shift link 44 is configured to couple with a shift gear 55 using through bolt 56. As described in detail below, shift gear 55 is configured to mate with shift tube 57 to provide operative shifting and gear ratio adjustment of transmission 11. Shift tube 57 is fixed to lock assembly 34 and is configured to rotate about central axle 20 as discussed in detail below. Shift link 44 is adapted to be driven by control assembly 12 via shift gear 55 and shift tube 57.

Figure 5:
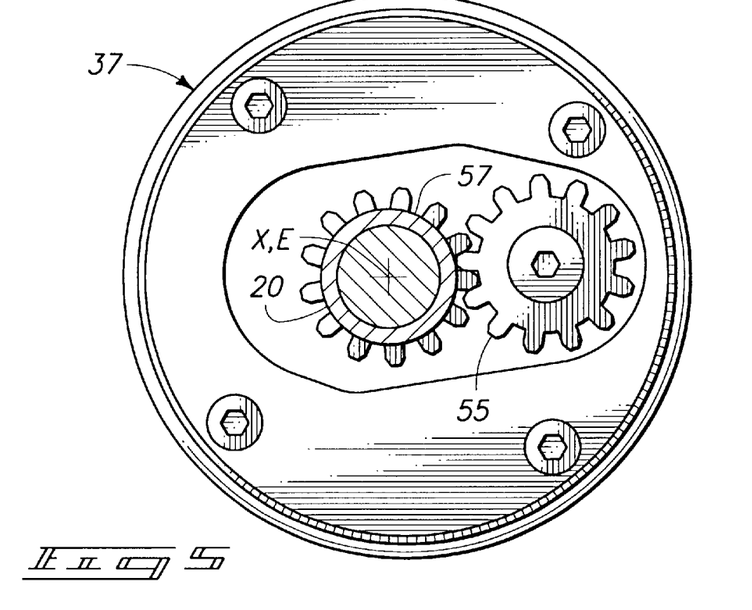
FIG. 5 is a side view of an eccentric mount of the mount assembly in a first extreme position.
Figure 6:
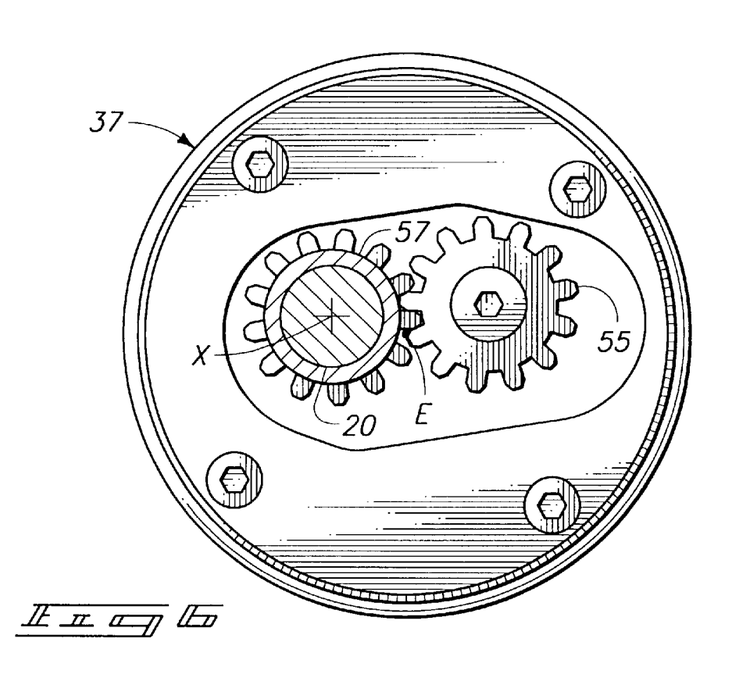
FIG. 6 is a side view of the eccentric mount of the mount assembly in a second extreme position.

Referring to FIG. 5 and FIG. 6, movement of eccentric mount 37 and eccentric axis E—E relative to mount support 36 and central axle 20 and central axis X—X is described. Eccentric mount 37 is configured to move intermediate the first extreme position shown in FIG. 5 to the second extreme position illustrated in FIG. 6.

In the first extreme position of eccentric mount 37 shown in FIG. 5, transmission 11 is locked-up and provides a gear ratio of approximately 1:1. In the second extreme position of eccentric mount 37 shown in FIG. 6, a gear ratio of approximately 3.5:1 is provided. An operator can control the position of eccentric mount 37 to provide any desired gear ratio between the first extreme position of FIG. 5 (1:1) and the second extreme position of FIG. 6 (3.5:1) utilizing control assembly 12 coupled with shift tube 57 and shift gear 55.

As shown, central axis X—X and eccentric axis E—E are provided in a coaxial arrangement in FIG. 5. Central axis X—X and eccentric axis E—E are also parallel. Responsive to user control via control assembly 12, shift tube 57 and shift gear 55 rotate to adjust the position of eccentric mount 37 relative to mount support 36. Offsetting eccentric mount 37 also operates to offset orbiter 19 providing adjustment of the gear ratio of transmission 11. Eccentric axis E—E is offset relative to central axis X—X in the second extreme position shown in FIG. 6.

Figure 7:
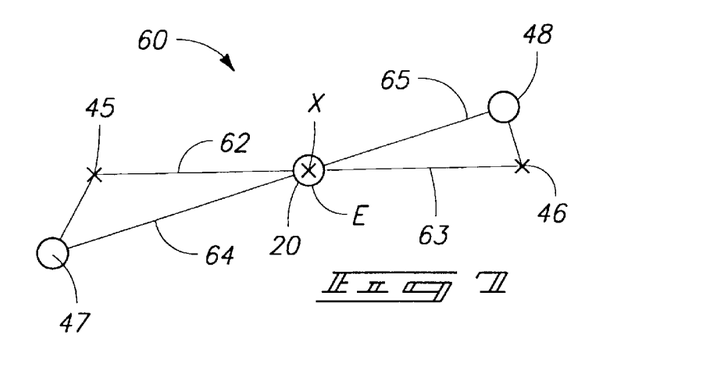
FIG. 7 is a diagrammatic representation of linkages of the mount assembly corresponding to the first extreme position.
Figure 8:
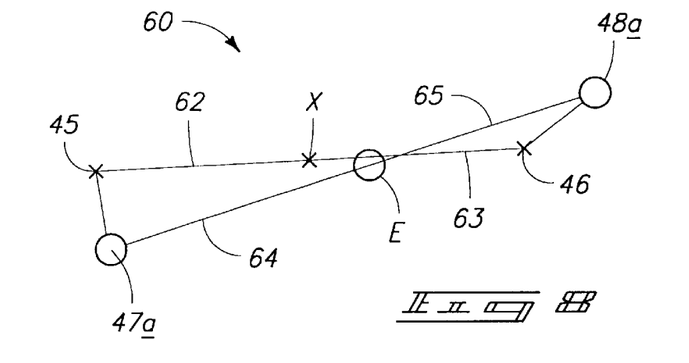
FIG. 8 is a diagrammatic representation of linkages of the mount assembly corresponding to the second extreme position.

Referring to FIG. 7 and FIG. 8, a linkage 60 coupling mount support 36 with eccentric mount 37 is described. FIG. 7 corresponds to the first extreme position of eccentric mount 37 with respect to mount support 36 shown in FIG. 5. FIG. 8 corresponds to the second extreme position of eccentric mount 37 with respect to mount support 36 shown in FIG. 6.

Idle link 43, shift link 44, mount support 36, and eccentric mount 37 define linkage 60 shown in FIG. 7 and FIG. 8. Linkage 60 comprises a four bar linkage in the described embodiment. Linkage 60 includes plural linkages 62–65. First and second linkages 62, 63 are defined from central axle 20 to respective pivots 45, 46 of idle link 43 and shift link 44. Linkages 62, 63 may be referred to as ground linkages. A center of eccentric mount 37 (corresponding to eccentric axis E—E) and pivots 47, 48 of respective links 43, 44 define linkages 64, 65. Linkages 62–65 provide four bar linkage 60 movable intermediate the first extreme position shown in FIG. 7 and the second extreme position shown in FIG. 8. Pivots 47, 48 are positioned in the orientation of FIG. 7 during positioning of eccentric mount 37 in the first extreme position. Positions 47a, 48a illustrate positioning of the pivots during positioning of eccentric mount 37 in the second extreme position. Axis X—X and axis E—E are coaxial in the illustration of FIG. 7. FIG. 8 illustrates an offset orientation of axis X—X and axis E—E.

Figure 9:
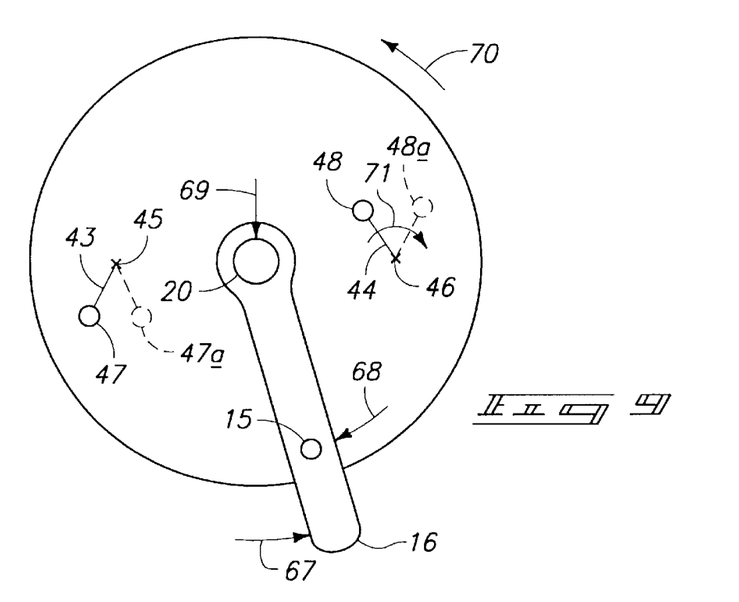
FIG. 9 is a diagrammatic illustration representing forces acting upon the transmission during loading thereof.

Referring to FIG. 9, positioning of pivots 47, 48 of respective links 43, 44 in first and second extreme positions corresponding to orbiter 19 being centered about central axle 20 and offset with respect to central axle 20 are illustrated. Pivots 47, 48 correspond to orbiter 19 being in the first position and pivot positions 47a and 48a correspond to orbiter 19 being in the second position. Providing radial adjustment or spacing of eccentric axis E—E with respect to central axis X—X (offsetting of the axes) generates resultant forces.

More specifically, at least one resultant force is generated responsive to eccentric axis E—E being offset with respect to central axis X—X and application of a driving (e.g., peddling) force via drive member 22. In the preferred embodiment, mount assembly 32 is configured to utilize at least one resultant force to assist with movement of eccentric mount 37 with respect to mount support 36.

During operation under loading conditions, such as during peddling, individual input vanes 16 are individually subjected to rotational forces represented by arrows 67, 68 (only one input vane 16 is represented in FIG. 9). Arrow 67 represents the force acting upon vane 16 responsive to an external peddling force applied via drive member 22. Arrow 68 represents a force acting upon vane 16 from orbiter 19 and pin 15 in a direction opposite to the direction of the force represented by arrow 67.

Application of force 67 in combination with offsetting of orbiter 19 with respect to central axle 20 generates a resultant tangential force 70 provided about central axle 20. Tangential force 70 is applied about the circumference of transmission 11.

Providing offsetting of orbiter 19 with respect to central axis X—X results in a downforce represented by arrow 69 upon axle 20. Downforce 69 urges orbiter 19 to return to the first extreme position wherein axis X—X and E—E are coaxial. In conventional configurations, downforce 69 has been noticed to feedback through the shift mechanism to the associated control assembly. Such requires the operator to continue to apply force to control assembly to resist the feedback forces.

The arrangement of mount assembly 32 including mount support 36 and eccentric mount 37 in accordance with the present invention significantly reduces the effects of the resultant forces generated during offsetting of orbiter 19 with respect to central axle 20. Links 43, 44 are positioned within mount assembly 32 to utilize resultant forces 69, 70 to assist with movement of eccentric mount 37 from the first extreme position in a direction toward the second extreme position.

More specifically, once orbiter 19 is offset from central axle 20, resultant downforce 69 acts upon transmission 11. Responsive to operator control, shift link 44 experiences a radial torque from shift gear 55 as represented by arrow 71. Such radial torque 71 begins movement of pivots 47, 48 towards respective pivot positions 47a, 48a. Resultant forces 69, 70 tend to oppose rotation of shift link 44 in a clockwise direction about pivot 46. However, following application of radial torque 71 about pivot 46, resultant forces 69, 70 aid with rotation of idle link 43 about pivot 45 from the depicted position of pivot 47 towards pivot position 47a. Resultant forces 69, 70 aid with rotation of link 43 about pivot 45 until the pivots 45, 47 are substantially aligned with forces 69, 70.

Once pivots 45, 47 of link 43 are substantially aligned with the resultant forces 69, 70, downforce 69 assists with the rotation of shift link 44 in a clockwise direction with respect to pivot point 46 and corresponding to movement of pivot 48 toward pivot position 48a. Thus, subsequent to application of radial torque 71, resultant forces initially assist with rotation of link 43 in a counterclockwise direction with respect to pivot 45 and subsequently assist with clockwise rotation of link 44 with respect to pivot 46. Such assists in movement of eccentric mount 37 from the first extreme position towards the second extreme position.

Figure 10:
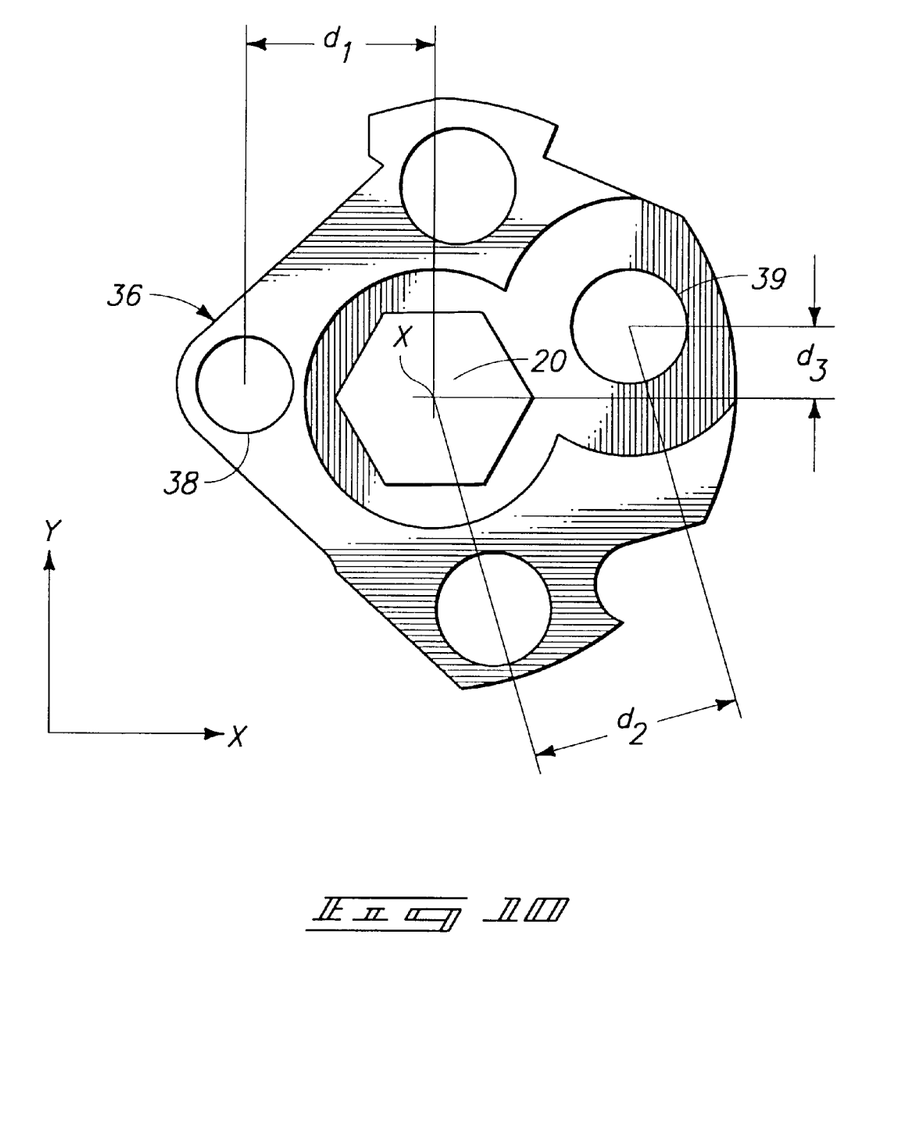
FIG. 10 is an elevated front view of a mount support of the mount assembly.

Referring to FIG. 10 mount support 36 is shown in an elevational side view about central axle 20. Idle link pivot bore 38 and a shift link pivot bore 39 are illustrated. As shown, the center of bore 38 is provided a fixed distance $d_1$ from central axis X—X. In the described embodiment, the center of bore 38 lies in the same x plane as axis X—X and is provided a distance $d_1$ of 0.554 inches from central axis X—X. The center of bore 39 is provided a fixed distance $d_2$ equal to 0.650 inches from central axis X—X. In addition, the center of bore 39 is provided a distance $d_3$ equal to 0.222 inches in the y direction relative to central axis X—X. Although the configuration of mount support 36 depicted in FIG. 10 is preferred, other configurations or constructions may be utilized in accordance with the present invention.

Figure 11:
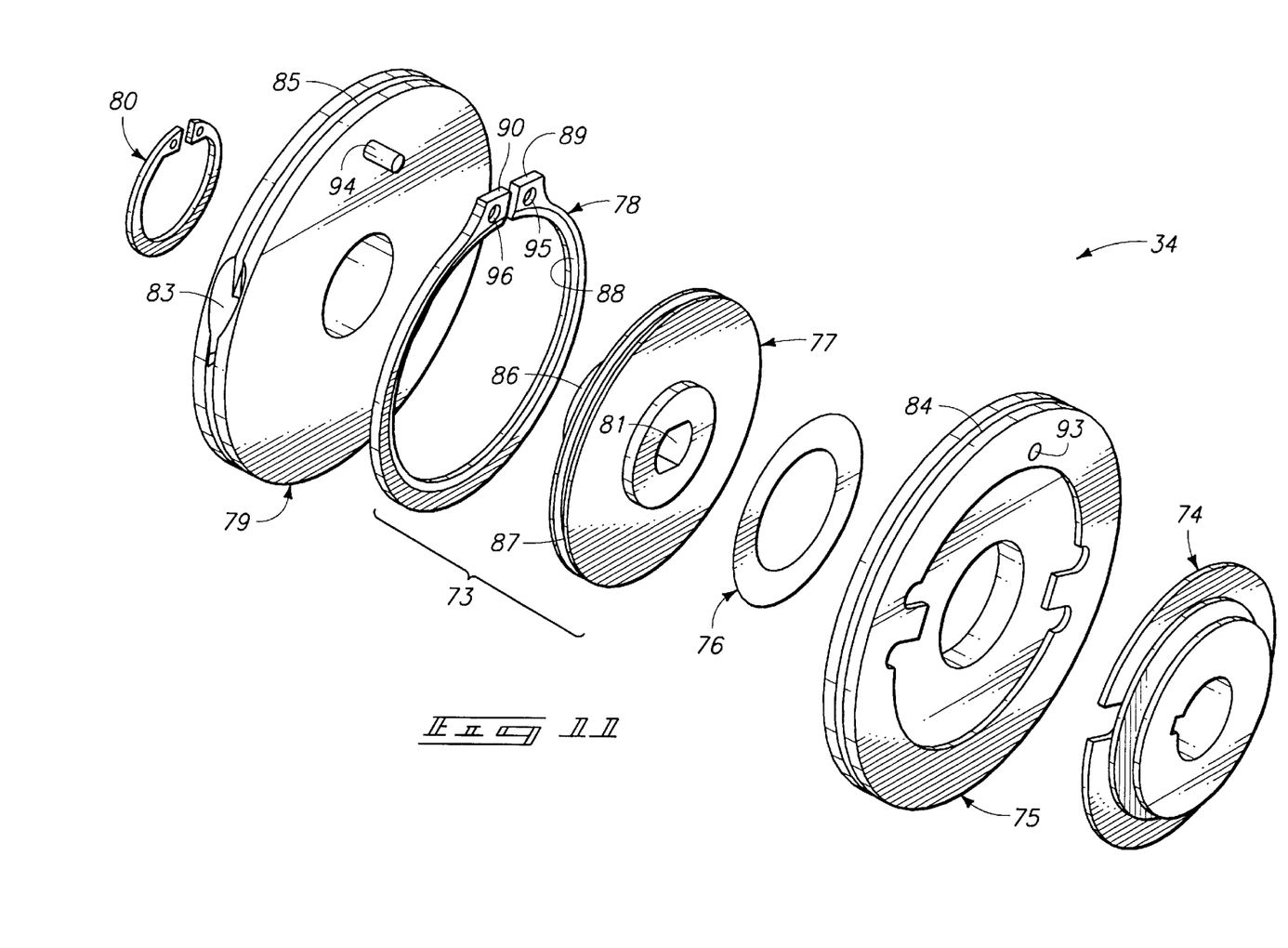
FIG. 11 is an exploded view of one embodiment of a lock assembly of the shift mechanism.

Referring to FIG. 11, one embodiment of lock assembly 34 is shown in detail. Other lock assemblies 34 can be utilized in other embodiments. Lock assembly 34 is configured to couple with mount assembly 32 and lock the position of eccentric mount 37 relative to mount support 36 and central axle 20. Locking of eccentric mount 37 reduces application of feedback forces to control assembly 12.

In particular, lock assembly 34 operates in the preferred embodiment to lock eccentric mount 37 at any desired location intermediate and including the first extreme position and the second extreme position. Such positions eccentric mount 37 at a desired location providing a desired gear ratio of transmission 11 while overcoming resultant forces which urge orbiter 19 and eccentric mount 37 towards the first extreme position.

The depicted lock assembly 34 comprises a bearing race 74, upshift member 75, washer 76, retaining disk 77, retaining member 78, downshift member 79, and ring 80. Components 74–80 of lock assembly 34 are configured to receive central axle 20. Ring 80 is operable to maintain downshift member 79 coupled with retaining member 77. Ring 80 can be attached to a shaft 86 of member 77.

Bearing race 74 is preferably fixedly attached to shift tube 57. Such is accomplished by spot welding in one exemplary embodiment. Bearing race 74 and upshift member 75 are keyed for mated coupled rotation about central axle 20. Responsive to an external force applied to upshift member 75 from control assembly 12, member 75 and race 74 rotate causing rotation of shift tube 57 in a first direction (e.g., clockwise) and upshift gear adjustment of transmission 11. Force can also be applied to downshift member 79 from control assembly 12 providing rotation of race 74 and shift tube 57 in a second direction (e.g., counter-clockwise) opposite the first direction.

Figure 12:
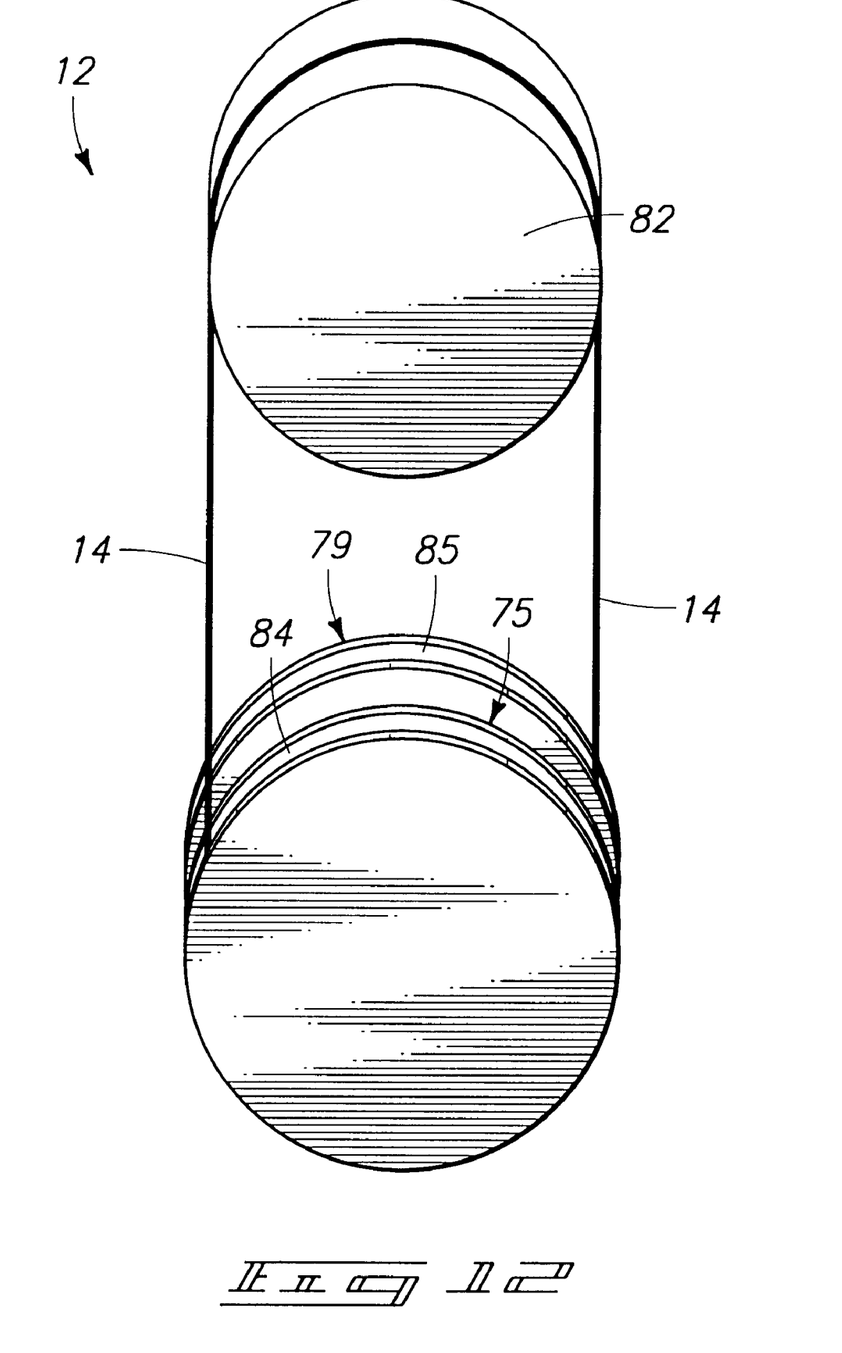
FIG. 12 is a diagrammatic representation of a control assembly coupled with plural shift members of the lock assembly.

Referring to FIG. 12, control assembly 12 comprises a twist grip type controller 82. Controller 82 can be conveniently located upon the handlebars of bicycle 10 and configured to rotate in first and second directions providing respective upshift and downshift operations.

In particular, controller 82 is coupled with cables 14 in the described embodiment. A single continuous cable or two separate cables can be provided. Upshift member 75 and downshift member 79 are coupled with cables 14 connected with controller 82 of control assembly 12. In particular, upshift and downshift members 75, 79 include respective pockets for receiving cables 14 (pocket 83 corresponding to downshift member 79 is illustrated in FIG. 11). Upshift and downshift members 75, 79 include respective grooves 84, 85 operable to receive cables 14 as also illustrated in FIG. 11.

Upshift member 75 is coupled with mount assembly 32 via shift tube 57 and shift gear 55. Upshift member 75 is configured to provide movement of eccentric mount 37 in a first direction toward the second extreme position. Rotation of controller 82 in a first direction (clockwise in FIG. 12) provides clockwise rotation of upshift member 75 and upshifting or a higher gear ratio within transmission 11. Rotation of controller 82 in a second direction (counter-clockwise in FIG. 12) provides counter-clockwise rotation of downshift member 79 and a lower gear ratio within transmission 11. Downshift member 79 is coupled with upshift member 75 and retaining member 78 and is configured to provide movement of eccentric mount 37 in a second direction toward the first extreme position. More specifically, downshift member 79 is configured to unlock spring 78 relative to retaining disk 77 and provide movement of eccentric mount 37 in the second direction. Other control assembly configurations 12 can be utilized.

Referring again to FIG. 11, retaining assembly 73 comprising disk 77 and spring 78 are provided about central axle 20. Retaining disk 77 includes a keyed central aperture 81. Aperture 81 is configured to receive central axle 20. Retaining disk 77 is fixed in a given orientation relative to central axle 20 in the described embodiment. Retaining disk 77 includes a beveled groove 87 configured to mate with an inner surface 88 of retaining member 78.

Retaining member 78 preferably comprises a spring having plural ears 89, 90. Retaining member 78 is coupled with upshift member 75 and is configured to lock the position of upshift member 75 and eccentric mount 37. In a preferred embodiment, groove 87 and surface 88 are formed at mating 30° angles so retaining member or spring 88 can be received within groove 87 of retaining disk 77. Spring tension of retaining member 78 operates to oppose rotation of retaining member 78 and upshift member 75 with respect to retaining disk 77 and central axle 20.

As referred to above, upshift member 75 is configured to rotate about central axis 20 of transmission 11 and implement an upshift gearing operation of transmission 11. Downshift member 79 is configured to rotate about central axle 20 of transmission 11 and implement a downshift gearing operation of transmission 11. Retaining member 78 is coupled with upshift member 75 and downshift member 79 and is configured to rotate about retaining disk 77 responsive to rotation of one of upshift member 75 and downshift member 79.

Retaining member 78 is further configured to lock the position of upshift member 75 relative to retaining disk 77. More specifically, spring tension of retaining member 78 operates to lock upshift member 75 and retaining member 78 relative to central axle 20 and retaining disk 77.

Figures 13, 14, 15:
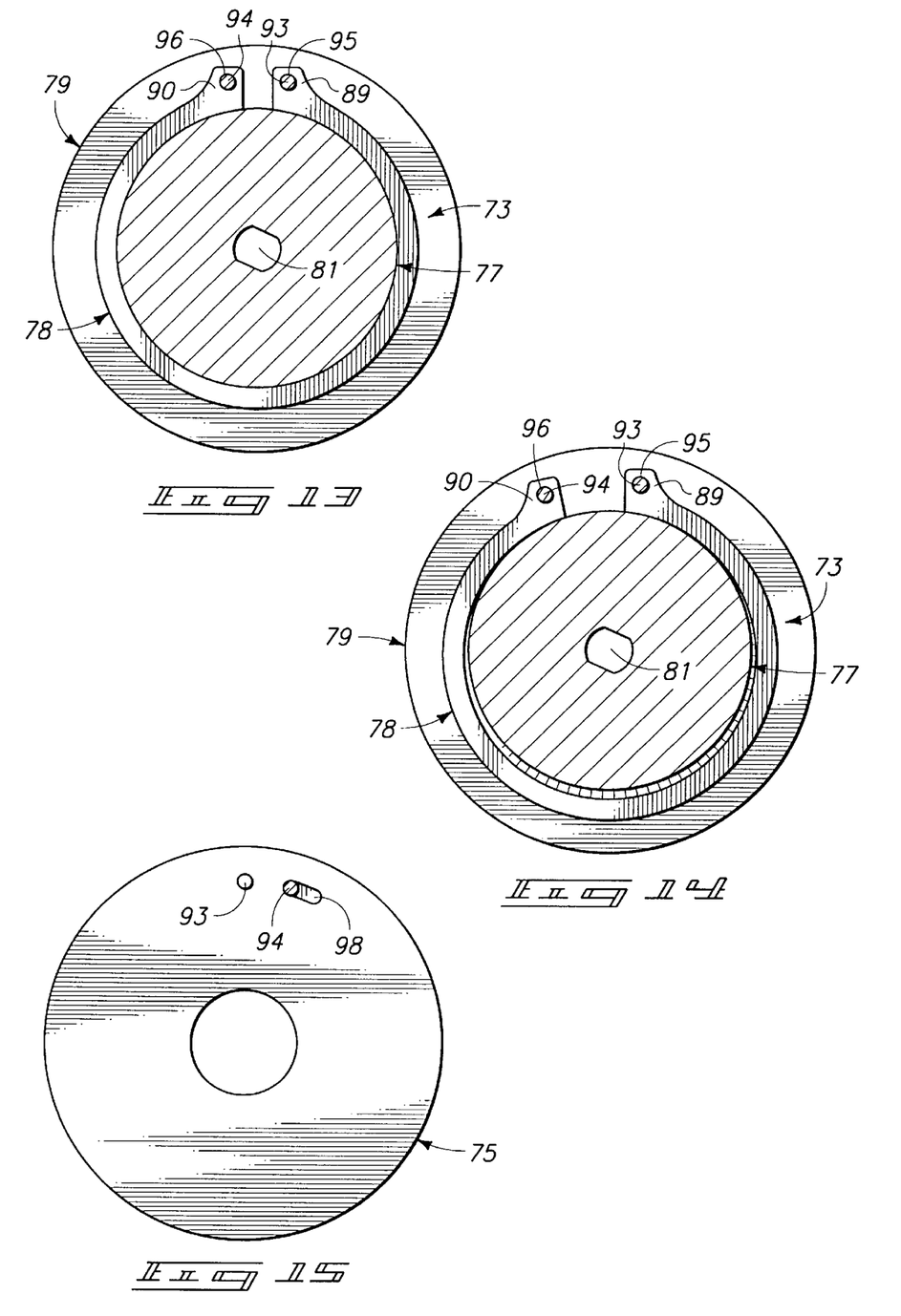
FIG. 13 is a cross-sectional view of the lock assembly showing a retaining assembly and a downshift member.
FIG. 14 is a cross-sectional view of the lock assembly similar to FIG. 13 illustrating a deformed position of a spring of the retaining assembly.
FIG. 15 is an elevated side view of an upshift member of the lock assembly.

Referring to FIG. 13 and FIG. 14, locking operations of retaining assembly 73 are described. Referring to FIG. 13, spring tension operates to lock retaining ring 78 with retaining disk 77. Such locks the position of upshift member 75 relative to central axle 20. Referring to FIG. 14, deformation of retaining member 78 permits rotation of retaining member 78 and shift members 75, 79 relative to retaining disk 77. Rotation of controller 82 within control assembly 12 causes direct rotation of one of upshift member 75 and downshift member 79 depending upon the direction of rotation of controller 82 operating to deform spring 78.

Referring to FIG. 13, spring 78 is locked in position relative to retaining member 77. Shift members 75, 79 include respective pins 93, 94 which are configured for engagement within respective apertures 95, 96 of ears 89, 90. Rotation of controller 82 of control assembly 12 in a first direction (e.g., clockwise with reference to FIG. 12) causes direct clockwise rotation of shift member 75 and pin 93 providing upshift operations. Although member 75 is not shown in FIG. 13 and FIG. 14, pin 93 extends therefrom and engages aperture 95 of ear 89.

Clockwise rotation of upshift member 75 moves pin 93 in an outward clockwise direction forcing ear 89 of spring 78 outwards thereby overcoming the spring tension of member 78 and permitting rotation of retaining member 78 with respect to disk 77. Spring 78 is shown deformed in FIG. 14 responsive to movement of pin 93. Deformed spring 78 has a larger inner diameter permitting rotation of retaining member 78 and member 75 about retaining disk 77. Rotation of upshift member 75 operates to rotate bearing race 74 and shift tube 57 and shift gear 55 coupled therewith implementing upshift operations of transmission 11.

During upshift operations, spring 78 deforms permitting rotation of spring 78 in a clockwise direction with respect to retaining disk 77. Rotation of spring 78 imparts a clockwise rotational force to downshift member 79 via ear 90 and pin 94. In one sense, spring 78 operates to drag downshift member 79 in a clockwise direction during upshift rotation of controller 82.

Following the removal of a twisting action upon controller 82 of control assembly 12, spring 78 returns to the position shown in FIG. 13 and locks upshift member 75 with respect to central axle 20. In particular, retaining assembly 73 operates to lock the orientation of s upshift member 75 with respect to retaining disk 77 and central axle 20. Thus, using controller 82, an operator can lock the retaining member 78 with respect to disk 77 during an upshift operation to provide an intermediate gear ratio of transmission 11 intermediate the first extreme position and the second extreme position.

During downshift operations, the controller 82 of control assembly 12 is rotated in an opposing direction (e.g., counter-clockwise with reference to FIG. 12) causing counter-clockwise rotation of downshift member 79 and pin 94. Counter-clockwise rotation of downshift member 79 and pin 94 deforms spring 78 permitting rotation of spring 78 about disk 77 in a counter-clockwise direction. Counter-clockwise rotation of downshift member 79 operates to drag spring 78 and upshift member 75 in a counter-clockwise direction. Such implements downshifting operations inasmuch as rotation of upshift member 75 in a counter-clockwise direction causes counter-clockwise rotation of shift tube 57 and shift gear 55.

Further, the resultant forces including the downforce and tangential force described above also operate to assist with downshifting operations. The resultant forces urge orbiter 19 and eccentric mount 37 towards the first extreme position. The operator can remove a twisting force applied to controller to lock the position of eccentric mount 37 and the gear ratio of transmission 11.

Using controller 82, an operator can lock the retaining member 78 with respect to disk 77 during a downshift operation to provide an intermediate gear ratio of transmission 11 intermediate the first extreme position and the second extreme position.

Referring to FIG. 15, upshift member 75 includes a receiving groove 98 in the surface facing retaining assembly 73. Retaining groove 98 is configured to receive pin 94 of downshift member 79. During downshift operations, groove 98 is arranged to prevent over-rotation of downshift member 79 as a result of the resultant tangential force and downforce and/or counter-clockwise rotation of controller 82. During the downshift operation, pin 94 moves in a clockwise direction as shown in FIG. 15 and is retained by the right end of groove 98 from over-rotation. Such tends to reduce strain upon retaining member 78.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A shift mechanism configured to adjust a transmission, the shift mechanism comprising:
    a central axle defining a central axis;
    a drive member configured to rotate about the central axle responsive to an application of a driving force to the drive member; and
    a mount assembly comprising a mount support and an eccentric mount, the mount support being provided about the central axle and the eccentric mount defining an eccentric axis, the eccentric mount being movably coupled with the mount support to provide radial adjustment of the eccentric axis relative to the central axis and wherein resultant forces are generated responsive to the eccentric axis being spaced from the central axis, and the mount assembly being configured to utilize at least one resultant force to assist with movement of the eccentric mount with respect to the mount support.

2. The shift mechanism according to claim 1 wherein the mount support and eccentric mount are coupled via a linkage having plural bars.

3. The shift mechanism according to claim 1 wherein the mount assembly includes a shift link and an idle link.

4. The shift mechanism according to claim 3 wherein the shift link, idle link, mount support and eccentric mount define a four bar linkage.

5. The shift mechanism according to claim 3 wherein the shift link is adapted to be driven by a control assembly.

6. The shift mechanism according to claim 1 further comprising a lock assembly coupled with the mount assembly and configured to lock the position of the eccentric mount relative to the mount support.

7. The shift mechanism according to claim 1 wherein the central axis and the eccentric axis are parallel.

8. The shift mechanism according to claim 1 wherein the shift mechanism is configured to adjust a bicycle transmission.

9. A shift mechanism configured to adjust a transmission, the shift mechanism comprising:
    a central axle defining a central axis;
    a mount assembly comprising a mount support and an eccentric mount, the mount support being provided about the central axle and the eccentric mount defining an eccentric axis, the eccentric mount being configured to move with respect to the mount support and provide radial adjustment of the eccentric axis relative to the central axis and change the gear ratio of the transmission; and
    a lock assembly coupled with the mount assembly and configured to lock the position of the eccentric mount relative to the mount support.

10. The shift mechanism according to claim 9 wherein the mount support and eccentric mount are coupled via a linkage having plural bars.

11. The shift mechanism according to claim 9 wherein resultant forces are generated responsive to the eccentric axis being spaced from the central axis, and the mount assembly being configured to utilize at least one resultant force to assist with movement of the eccentric mount with respect to the mount support.

12. The shift mechanism according to claim 9 wherein the lock assembly is configured to control movement of the eccentric assembly.

13. The shift mechanism according to claim 9 further comprising a control assembly configured to control the position of the eccentric mount relative to the mount support.

14. The shift mechanism according to claim 9 wherein the lock assembly comprises:
    an upshift member coupled with the mount assembly and configured to provide movement of the eccentric mount in a first direction; and
    a retaining member coupled with the upshift member and configured to lock the position of the upshift member and the eccentric mount.

15. The shift mechanism according to claim 14 further comprising a downshift member coupled with the upshift member and the retaining member and configured to provide movement of the eccentric mount in a second direction.

16. The shift mechanism according to claim 15 wherein the downshift member is configured to unlock the spring relative to the retaining member to provide movement of the eccentric mount in the second direction.

17. The shift mechanism according to claim 15 wherein the upshift member, downshift member, and retaining member are provided about a central axle and movement of the upshift member and downshift member individually comprise rotational movement about the central axle, and the retaining member comprises a retaining disk and a spring engaged with the upshift member and downshift member, and the spring is configured to lock the rotational position of the upshift member relative to the retaining disc and the position of the eccentric mount relative to the mount support.

18. The shift mechanism according to claim 17 wherein the retaining disk is fixed in a given orientation with respect to the central axle.

19. A lock assembly of a continuously variable transmission which includes an eccentric mount assembly configured to change the gear ratio of the transmission, the lock assembly comprising:
    an upshift member configured to rotate about a central axle of the transmission and implement an upshift gearing operation of the transmission;

a downshift member configured to rotate about the central axle of the transmission and implement a downshift gearing operation of the transmission; and a retaining assembly comprising a retaining member and a retaining disk provided about the central axle, the retaining member being coupled with the upshift member and the downshift member and configured to rotate about the retaining disk responsive to rotation of one of the upshift member and the downshift member, the retaining member being further configured to lock the position of the upshift member relative to the retaining disk.

20. The lock assembly according to claim 19 wherein the retaining member comprises a spring.

21. The lock assembly according to claim 20 wherein spring tension of the retaining member locks the upshift member and the retaining member relative to the central axle and the retaining disk.

22. The lock assembly according to claim 20 wherein rotation of one of the upshift member and the downshift member deforms the spring to permit rotation of the spring relative to the retaining disk.

23. A transmission comprising:

a central axle defining a central axis;

a drive member configured to rotate about the central axle responsive to an application of a driving force to the drive member;

a driven member configured to rotate about the central axle;

an orbiter configured to couple the drive member and the driven member;

a mount assembly comprising a mount support and an eccentric mount, the mount support being provided about the central axle, and the orbiter being configured to rotate about the eccentric mount and the orbiter and the eccentric mount define an eccentric axis, the eccentric mount and the orbiter being configured to move with respect to the mount support and provide radial adjustment of the eccentric axis relative to the central axis, and wherein resultant forces are generated responsive to the eccentric axis being spaced from the central axis, and the mount assembly being configured to utilize at least one resultant force to assist with movement of the eccentric mount with respect to the mount support; and a lock assembly coupled with the mount assembly and configured to lock the position of the eccentric mount relative to the mount support.

24. A method of adjusting a gear ratio of a transmission comprising:

providing a plurality of rotatable members configured to rotate about a central axle which defines a central axis, the rotatable members being configured to rotate responsive to an application of a driving force;

providing a shift mechanism including an eccentric mount configured to define an eccentric axis;

adjusting the position of the eccentric mount relative to the central axle to adjust the gear ratio of the transmission, the adjusting creating resultant forces; and utilizing at least one of the resultant forces to assist with the adjusting.

25. The method according to claim 24 wherein the method comprises a method of adjusting a gear ratio of a bicycle transmission.

26. The method according to claim 24 wherein the adjusting comprises upshifting to a higher gear ratio.

27. The method according to claim 24 wherein the adjusting is responsive to input from a control assembly.

28. The method according to claim 27 further comprising reducing feedback forces conveyed to the control assembly following the upshifting.

29. The method according to claim 24 further comprising locking the position of the eccentric mount relative to the central axis.

30. The method according to claim 24 wherein the providing the shift mechanism further comprises coupling a mount support with the central axle and the eccentric mount, and the adjusting comprises moving the eccentric mount relative to the mount support.

31. The method according to claim 30 wherein the coupling the eccentric mount and the mount support comprises coupling using a linkage.

32. The method according to claim 24 wherein the coupling the eccentric mount and the mount support comprises coupling using a linkage configured to move responsive to the presence of the at least one resultant force.

33. A method of providing a desired gear ratio of a continuously variable transmission, the method comprising:

providing a central axle;

providing a mount assembly including a mount support and an eccentric mount;

adjusting a position of the eccentric mount relative to the mount support to adjust the gear ratio of the continuously variable transmission; and locking the position of the eccentric mount relative to the mount support.

34. The method according to claim 33 wherein the locking comprises locking using spring tension.

35. The method according to claim 33 wherein the locking further comprises locking the gear ratio of the transmission.

36. The method according to claim 33 wherein the adjusting generates resultant forces.

37. The method according to claim 33 further comprising utilizing at least one resultant force to assist with the adjusting.

38. The method according to claim 33 wherein the adjusting is responsive to input from a control assembly.

39. The method according to claim 38 further comprising reducing feedback forces conveyed to the control assembly following the upshifting.

* * * * *